United States Patent
Choi et al.

(10) Patent No.: US 9,602,602 B2
(45) Date of Patent: Mar. 21, 2017

(54) APPARATUS AND METHOD FOR IDENTIFYING INTEROPERABILITY BETWEEN OBJECT IDENTIFIER-BASED HETEROGENEOUS IDENTIFIER NODES FOR NEXT GENERATION NETWORK

(71) Applicant: ELECTRONICS AND TELECOMMUNICATIONS RESEARCH INSTITUTE, Daejeon (KR)

(72) Inventors: Young-Hwan Choi, Daejeon (KR); Jun-Seob Lee, Daejeon (KR); Hyoung-Jun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 458 days.

(21) Appl. No.: 14/196,166

(22) Filed: Mar. 4, 2014

(65) Prior Publication Data

US 2014/0310384 A1    Oct. 16, 2014

(30) Foreign Application Priority Data

Apr. 11, 2013    (KR) .................. 10-2013-0040092

(51) Int. Cl.
*G06F 15/16*    (2006.01)
*H04L 29/08*    (2006.01)
(Continued)

(52) U.S. Cl.
CPC ........ *H04L 67/12* (2013.01); *H04L 29/12009* (2013.01); *H04L 41/0233* (2013.01);
(Continued)

(58) Field of Classification Search
CPC ... H04L 41/0233; H04L 61/103; H04L 61/15; H04L 61/2084; H04L 67/10; H04L 67/12; H04L 29/12009
(Continued)

(56) References Cited

U.S. PATENT DOCUMENTS 7,379,960 B2 * 5/2008 Dimitroff .......... G06F 17/30575
707/E17.032
8,255,506 B2   8/2012 Lee et al.
(Continued)

FOREIGN PATENT DOCUMENTS

JP    2008-522482    6/2008
KR    10-0872961     12/2008
(Continued)

*Primary Examiner* — Michael Y Won
(74) *Attorney, Agent, or Firm* — Staas & Halsey LLP

(57) ABSTRACT

Disclosed herein are an apparatus and method for identifying interoperability between object-identifier-based heterogeneous identifier nodes for a next generation network. The apparatus includes a plurality of identifier registry servers located in a plurality of unit networks connected to an open network, and configured to receive and store identifiers and locators of nodes of corresponding unit networks, and also configured to, as identifiers of destination nodes that are communication target nodes are input from nodes of the unit networks, return locators of the destination nodes, wherein unique object identifiers are assigned to the identifier registry servers. An object identifier resolution server is located in the open network, and is configured to receive and store object identifiers and locators of the identifier registry servers, and is also configured to, as object identifiers are input from nodes of the unit networks, transfer locators of identifier registry servers to the nodes.

6 Claims, 5 Drawing Sheets

(51) Int. Cl.
  *H04L 29/12* (2006.01)
  *H04L 12/24* (2006.01)
(52) U.S. Cl.
  CPC ............ *H04L 61/103* (2013.01); *H04L 61/15* (2013.01); *H04L 61/2084* (2013.01)
(58) Field of Classification Search
  USPC ....... 709/201, 212, 218, 219, 220, 227, 230, 709/238, 245
  See application file for complete search history.

(56) References Cited

U.S. PATENT DOCUMENTS

| | | | | |
|---|---|---|---|---|
| 2007/0058621 | A1* | 3/2007 | Okmianski | H04L 61/1535 370/389 |
| 2008/0155111 | A1* | 6/2008 | Takeuchi | H04L 67/2852 709/230 |
| 2009/0198997 | A1* | 8/2009 | Yeap | H04L 63/0823 713/155 |
| 2010/0094847 | A1* | 4/2010 | Malan | H04L 69/18 707/705 |
| 2010/0199276 | A1* | 8/2010 | Umbehocker | G06F 3/0604 718/1 |
| 2011/0282931 | A1* | 11/2011 | Chen | H04L 29/1216 709/203 |
| 2011/0283017 | A1* | 11/2011 | Alkhatib | H04L 12/4641 709/244 |
| 2013/0136060 | A1 | 5/2013 | Choi et al. | |

FOREIGN PATENT DOCUMENTS

| | | |
|---|---|---|
| KR | 10-0932785 | 12/2009 |
| KR | 10-1243926 | 3/2013 |
| KR | 10-2013-0060098 | 6/2013 |
| WO | WO 2006/080758 | 8/2006 |

* cited by examiner

APPARATUS AND METHOD FOR IDENTIFYING INTEROPERABILITY BETWEEN OBJECT IDENTIFIER-BASED HETEROGENEOUS IDENTIFIER NODES FOR NEXT GENERATION NETWORK

CROSS REFERENCE TO RELATED APPLICATION

This application claims the benefit of Korean Patent Application No. 10-2013-0040092 filed on Apr. 11, 2013, which is hereby incorporated by reference in its entirety into this application.

BACKGROUND OF THE INVENTION

1. Technical Field

The present invention relates generally to an apparatus and method for identifying interoperability between object identifier-based heterogeneous identifier nodes for a next generation network and, more particularly, to an apparatus and method that enable communication to be performed between nodes having heterogeneous identifiers in a next generation network.

2. Description of the Related Art

The current Internet is configured such that all communication schemes operate with each other in compliance with predetermined rules based on Transmission Control Protocol/Internet Protocol (TCP/IP).

Therefore, all nodes for performing communication in current Internet systems inevitably have the same identification system (based on IDs: identifiers). However, services to be predicted in the next generation Internet may not provide simple information, but may reproduce various types of information in a convergence and hybrid manner and provide services. For example, mirror products, smart phone services, etc. for converging personal medical information and private information and reflecting various types of information, such as the adjustment of treatment schedules in hospitals, based on the converged information, may be representative examples of such services.

In this way, in future networks, resources having different identification systems must be connected to each other in a convergence and hybrid manner, and must be able to communicate with each other so as to exchange information with each other. That is, identification services between resources having different identifiers are first required.

Currently, since nodes capable of communicating with each other over the Internet must comply with the same type of protocol, nodes having the same identifier (ID) or the same address (locator) are present, but nodes having different identification systems, other than TCP/IP systems, are also present as in a Radio Frequency Identification (RFID)-based network or a sensor network. Of course, the identifiers of the nodes are different from each other, and thus communication between sensor nodes, TCP/IP-based nodes, and RFID nodes is impossible in the current Internet. That is, a plurality of problems must be solved, but the impossibility of communication in the current Internet means that mutual identification is primarily impossible.

Even so, the development of new identifiers enabling those nodes to be integrated requires a lot of time and cost because existing identifier-based services must be newly developed or revised in accordance with new identifiers. Furthermore, since it is very difficult to change identifier-based services while maintaining current services, it may be considered impossible to develop new integrated identifiers.

As another problem, even if each identifier is unique in a closed unit network making it impossible to directly communicate with an external network, it may be impossible to guarantee the uniqueness of each identifier when existing heterogeneous identifier-based networks are integrated into a single open network. That is, two nodes in different systems may accidently have the same identifier. Each identifier is generally created in a combined form of characters, numerals, and/or symbols, and thus it is natural that identifiers of two nodes having different identification systems may be accidently identical to each other. In each closed unit network, the uniqueness of each identifier must have been guaranteed, but if the networks have been integrated into an open network, multiple nodes having the same identifier cannot be present, thus causing a collision of identifiers. That is, since the uniqueness of an identifier is not guaranteed, it is absolutely impossible to perform communication between the nodes in which the uniqueness of the identifier is not guaranteed.

Finally, since all network systems are different from each other from the standpoint of configuration, it is impossible for the network systems to operate with each other in an integrated manner over the current Internet. For example, even in TCP/IP, Internet Protocol version (IPv6) has been developed. However, when the Internet protocol has not yet switched from IPv4 to IPv6, and then IPv4 and IPv6 coexist in different states, nodes directly connected to the Internet are present, but sensor nodes must be able to accommodate a case where a gateway must be passed through or the like so as to connect to an external network.

Related prior art includes technology disclosed in Korean Patent No. 1243926 (entitled "Method and apparatus for managing a network") which defines identifiers (managed object set ID) or profiles (managed object profile) describing the characteristics of a sensor network, that is, a set of managed objects, and allows a sensor network manager and a sensor network gateway (or a sensor node) to exchange such information (information about the set of managed objects) with each other, so that the sensor network manager acquires the information about the set of managed objects and then manages a target sensor network.

Another related prior art includes technology disclosed in Korean Patent No. 0932785 (entitled "System for providing integrated subscriber recognition in heterogeneous networks and mobile IP registration method for the same") which provides integrated subscriber recognition in heterogeneous networks in which networks using different types of Network Access Identifiers (NAIs) coexist.

A further related prior art includes technology disclosed in Korean Patent No. 0872961 (entitled "Method for communication between heterogeneous networks") which manages the sessions of mobile communication terminals which move to different home networks implemented as heterogeneous networks in an integrated manner, thus providing seamless communication services.

SUMMARY OF THE INVENTION

Accordingly, the present invention has been made keeping in mind the above problems occurring in the prior art, and an object of the present invention is to provide an apparatus and method for identifying interoperability between object-identifier-based heterogeneous identifier nodes for a next generation network, which can identify heterogeneous system nodes in a next generation network, and exchange various types of information between heterogeneous resources based on such identification.

In accordance with an aspect of the present invention to accomplish the above object, there is provided an apparatus for identifying interoperability between object identifier-based heterogeneous identifier nodes for a next generation network, including a plurality of identifier registry servers respectively located in a plurality of unit networks connected to an open network, and configured to receive and store identifiers and locators of nodes of corresponding unit networks, and also configured to, as identifiers of destination nodes that are communication target nodes are input from nodes of the plurality of unit networks, return locators of the destination nodes, wherein unique object identifiers are respectively assigned to the identifier registry servers; and an object identifier resolution server located in the open network, and configured to receive and store object identifiers and locators of the plurality of identifier registry servers, and also configured to, as object identifiers are input from nodes of the plurality of unit networks, transfer locators of identifier registry servers corresponding to the object identifiers to the nodes, wherein the plurality of unit networks include nodes having different heterogeneous identifiers.

Preferably, the plurality of unit networks may include a first unit network and a second unit network, and nodes of the first unit network and the second unit network are directly connected to the open network.

Preferably, the object identifier resolution server may be configured to, if an object identifier of an identifier registry server of the second unit network is input from a node of the first unit network, transmit a locator of the identifier registry server of the second unit network to the node of the first unit network, and the identifier registry server of the second unit network may be configured to, if an identifier of a destination node that is a communication target node is input from the node of the first unit network, transmit a locator of the destination node to the node of the first unit network, thus allowing data to be transmitted from the node of the first unit network to the destination node. In this case, the node of the first unit network may previously know the identifier of the destination node that is the communication target node.

Preferably, the plurality of unit networks may further include a third unit network, the third unit network includes a node having an identifier differing from those of nodes of the first unit network and the second unit network, and the node of the third unit network is connected to the open network via a gateway.

Preferably, an identifier and a locator of the node of the third unit network may be stored in the gateway, the gateway may connect the stored identifier to its own locator, transmit a resulting identifier/locator to an identifier registry server of the third unit network, and allow the resulting identifier/locator to be stored in the identifier registry server, and the identifier registry server of the third unit network may transmit its own object identifier and locator to the object identifier resolution server, and allow the object identifier and the locator to be stored in the object identifier resolution server.

Preferably, the node of the first unit network or the second unit network may be configured to, if a locator of the gateway is input from the identifier registry server of the third unit network, transmit an identifier and data of a destination node of the third unit network that is a communication target node to the gateway.

Preferably, if the node of the first unit network or the second unit network inputs an object identifier of an identifier registry server of the third unit network to the object identifier resolution server, the object identifier resolution server may be configured to transmit a locator of the identifier registry server of the third unit network to the node of the first unit network or the second unit network, the identifier registry server of the third unit network may be configured to, as an identifier of a destination node that is a communication target node is input from the node of the first unit network or the second unit network, transmit a locator of the gateway to the node of the first unit network or the second unit network, and the gateway may be configured to, if the identifier and data of the destination node are input from the node of the first unit network or the second unit network, transfer the data to the destination node.

In accordance with another aspect of the present invention to accomplish the above object, there is provided a method for identifying interoperability between object identifier-based heterogeneous identifier nodes for a next generation network, including transmitting, by nodes of a plurality of unit networks connected to an open network, their own identifiers and locators to identifier registry servers located in corresponding unit networks, and allowing the identifiers and locators to be registered; transmitting, by the identifier registry servers of the plurality of unit networks, their own object identifiers and locators to an object identifier resolution server located in the open network, and allowing the object identifiers and the locators to be registered; as object identifiers are input from nodes of the plurality of unit networks, transferring, by the object identifier resolution server, locators of identifier registry servers corresponding to the object identifiers to the corresponding nodes; and as identifiers of destination nodes that are communication target nodes are input, returning, by the corresponding identification registration servers, locators of the destination nodes to nodes desiring to communicate with the destination nodes, wherein the plurality of unit networks include nodes having different heterogeneous identifiers.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
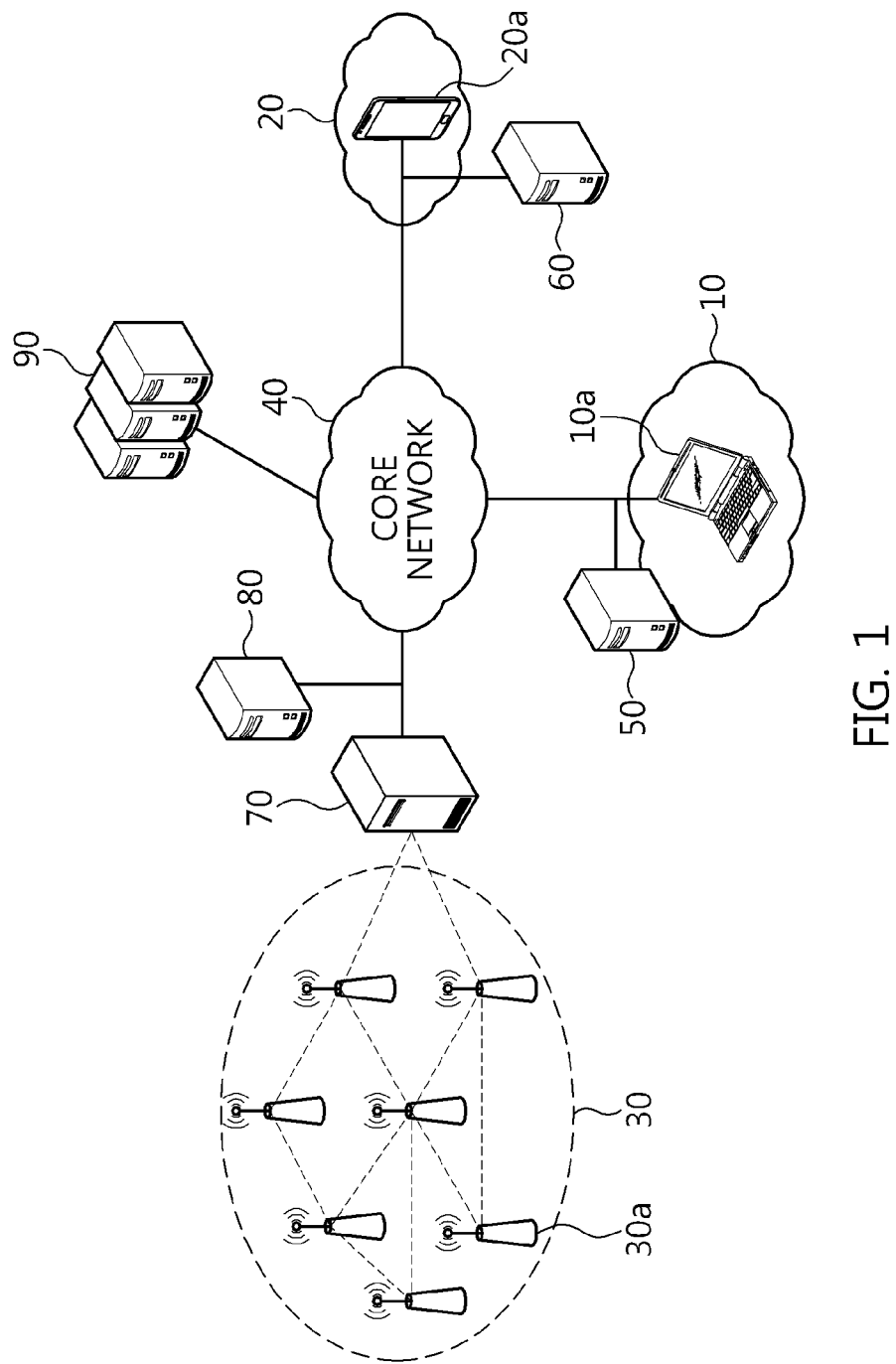
FIG. 1 is a diagram showing the configuration of an apparatus for identifying interoperability between object identifier-based heterogeneous identifier nodes for a next generation network according to an embodiment of the present invention.

Hereinafter, an apparatus and method for identifying interoperability between object identifier-based heterogeneous identifier nodes for a next generation network according to embodiments of the present invention will be described in detail with reference to the attached drawings. Prior to the detailed description of the present invention, it should be noted that the terms or words used in the present specification and the accompanying claims should not be limitedly interpreted as having their common meanings or those found in dictionaries. Therefore, the embodiments described in the present specification and constructions shown in the drawings are only the most preferable embodiments of the present invention, and are not representative of the entire technical spirit of the present invention. Accordingly, it should be understood that various equivalents and modifications capable of replacing the embodiments and constructions of the present invention might be present at the time at which the present invention was filed.

The present invention additionally attaches object identifiers (OIDs) to existing identifiers and utilizes resulting identifiers so that the uniqueness of all identifiers may be guaranteed when networks are integrated into a single open network while accommodating the existing identifiers without revising them. In addition, in order to operate heterogeneous identifiers and addresses (locators or current Internet addresses) in an integrated manner, registries (servers) for registering addresses and identifiers are provided in respective unit networks, and an OID resolution server for storing pieces of information of the respective registries in an integrated manner is provided, and thus a system for allowing the registries to operate with each other is prepared.

FIG. 1 is a diagram showing the configuration of an apparatus for identifying interoperability between object identifier-based heterogeneous identifier nodes for a next generation network according to an embodiment of the present invention.

A network A 10, a network B 20, and a network C 30 are unit networks and have heterogeneous identifiers (heterogeneous identification systems). The network A 10, the network B 20, and the network C 30 are connected to a single open network (core network) 40 in an integrated manner.

The network A 10 is the wireless network of a terminal 10a (e.g., a notebook computer or the like) directly connected to the open network 40.

The network B 20 is a mobile communication network such as the cellular network of a terminal 20a (e.g., a mobile phone) directly connected to the open network 40.

The network C 30 is the network of sensor nodes 30a indirectly connected to the open network 40 via a gateway 70.

An identifier registry server (ID registry) 50 is located in the network A 10, an identifier registry server 60 is located in the network B 20, and an identifier registry server 80 is located in the network C 30.

An OID resolution server 90 for storing pieces of information of the respective identifier registry servers 50, 60, and 80 in an integrated manner is located in the open network 40.

Meanwhile, the terminals (or nodes) 10a and 20a and the sensor nodes 30a present in the respective networks 10, 20, and 30 are communication entities, and basically have their own identifiers (IDs) and addresses (locators) for mutual communication.

The identifier registry server 50 registers and manages identifiers (IDs) and locators of terminals (or nodes) 10a present in the network A 10 in a lump. The identifier registry server 50 has a unique object identifier (OID). The identifier registry server 50 registers its own object identifier in the OID resolution server 90.

The identifier registry server 60 registers and manages IDs and locators of terminals (or nodes) 20a present in the network B 20 in a lump. The identifier registry server 60 has a unique object identifier (OID). The identifier registry server 60 registers its own object identifier in the OID resolution server 90.

The identifier registry server 80 registers and manages IDs and locators of the sensor nodes 30a present in the network C 30 in a lump. The identifier registry server 80 has a unique object identifier (OID). The identifier registry server 80 registers its own object identifier in the OID resolution server 90.

The OID resolution server 90 stores and manages object identifiers received from the respective identifier registry servers 50, 60, and 80. When object identifiers are input from the terminals (or nodes) or sensor nodes, the OID resolution server 90 returns the locators of identifier registry servers corresponding to the object identifiers to the terminals or sensor nodes. This service is called an OID resolution service.

In order for each of all nodes to communicate with heterogeneous identifier nodes present in other networks, the present invention supports the mutual resolution of identifiers between the nodes. For example, it is assumed that the terminal 20a of the network B 20 knows the ID of the node 10a of the network A 10. In this situation, when the terminal 20a sends the OID of the network A 10 to the OID resolution server 90 as an input value, the OID resolution server 90 returns the locator of the identifier registry server 50 of the network A 10 to the terminal 20a. Accordingly, when the terminal 20a of the network B 20 sends the ID of a desired communication target node 10a as an input value to the locator of the identifier registry server 50 of the network A 10, the identifier registry server 50 returns to the locator of the corresponding node to the terminal 20a. Then, the terminal 20a of the network B 20 comes to know the locator and the ID of the corresponding node 10a of the network A 10, and is then capable of transmitting data.

However, when an indirect connection via the gateway 70 other than a direct connection is made, that is, when the terminal 20a of the network B 20 transmits data to the sensor node 30a of the network C 30, a locator returned through the identifier registry server 80 of the network C 30 is the locator of the gateway 70 instead of the locator of the sensor node of the network C 30. The terminal 20a of the network B 20 considers that the locator of the gateway 70 of the network C 30 is the locator of the sensor node 30a, and transmits the ID and data of the sensor node 30a. Consequently, an object which receives the data is the gateway 70, and the gateway 70 checks the received ID and transfers the data to the sensor node 30a.

Figure 2:
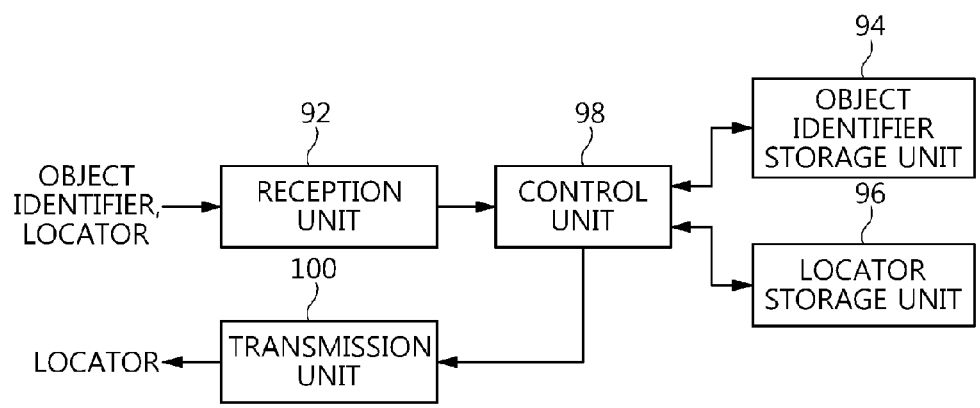
FIG. 2 is a block diagram showing the internal configuration of an object identifier resolution server shown in FIG. 1.

FIG. 2 is a block diagram showing the internal configuration of the OID resolution server shown in FIG. 1.

The OID resolution server 90 includes a reception unit 92, an object identifier storage unit 94, a locator storage unit 96, a control unit 98, and a transmission unit 100.

The reception unit 92 receives the OIDs and locators of the respective identifier registry servers 50, 60, and 80 transmitted from the identifier registry servers 50, 60, and 80.

The object identifier storage unit 94 stores the OIDs of the respective identifier registry servers 50, 60, and 80.

The locator storage unit 96 stores the locators of the respective identifier registry servers 50, 60, and 80.

Here, since the object identifier storage unit 94 and the locator storage unit 96 may be integrated into a single storage unit, they may be collectively called a storage unit.

The control unit 98 stores the OIDs of the respective identifier registry servers 50, 60, and 80 received by the reception unit 92 in the object identifier storage unit 94, and stores the locators of the respective identifier registry servers 50, 60, and 80 received by the reception unit 92 in the locator storage unit 96. Further, as the control unit 98 receives OIDs from terminals (or nodes) or sensor nodes, it returns the locators of the identifier registry servers corresponding to the OIDs through the transmission unit 100.

Meanwhile, although the internal configuration of each of the identifier registry servers 50, 60, and 80 is not presented in a separate drawing, those skilled in the art will easily and sufficiently derive the internal configuration of the identifier registry servers 50, 60, and 80 based on the above description of the identifier registry servers 50, 60, and 80.

Figure 3:
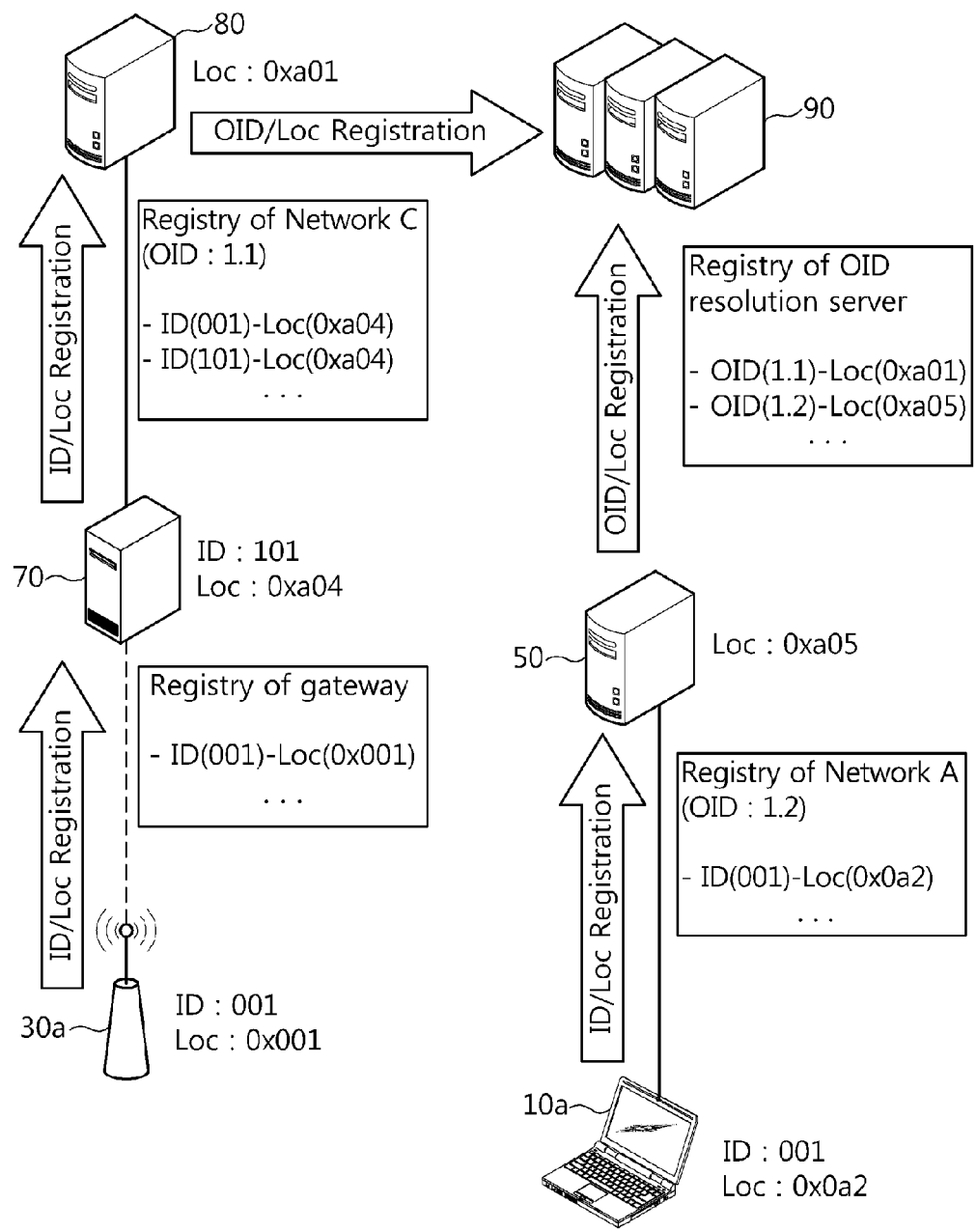
FIG. 3 is a diagram showing a process for registering an identifier, a locator, and an object identifier in the object identifier resolution server according to an embodiment of the present invention.

Below, a process for registering (including the meaning of storage) identifiers (IDs), locators, and object identifiers (OIDs) in the OID resolution server will be described with reference to FIG. 3. In FIG. 3, the process for registering the ID and locator of the terminal (or node) 10a of the network A 10 and the OID of the identifier registry server 50 of the network A 10 in the OID resolution server 90, and registering the ID and locator of the sensor node 30a of the network C 30 and the OID of the identifier registry server 80 of the network C 30 in the OID resolution server 90 will be exemplarily described below.

The terminal 10a of the network A 10 registers its own ID and locator in the identifier registry server 50 located in the corresponding network.

Further, since the sensor node 30a of the network C 30 is indirectly connected via the gateway 70, the IDs and locators of the sensor nodes 30a are registered in the gateway 70, and the registered IDs are newly connected to the gateway's own locator, and thus resulting IDs/locators are registered in the identifier registry server 80 of the corresponding network C 30.

Meanwhile, each of the identifier registry servers 50 and 80 registers its own OID and locator in the OID resolution server 90. Thereafter, when an OID is input, the OID resolution server 90 returns the locator of an identifier registry server corresponding to the OID.

Here, a process for registering the ID and locator of the terminal (or node) 20a of the network B 20 and the OID of the identifier registry server 60 of the network B 20 in the OID resolution server 90 is not described. The reason for this is that this process may be regarded as being identical to the above-described process for registering the ID and locator of the terminal (or node) 10a of the network A 10 and the OID of the identifier registry server 50 of the network A 10 in the OID resolution server 90.

Figure 4:
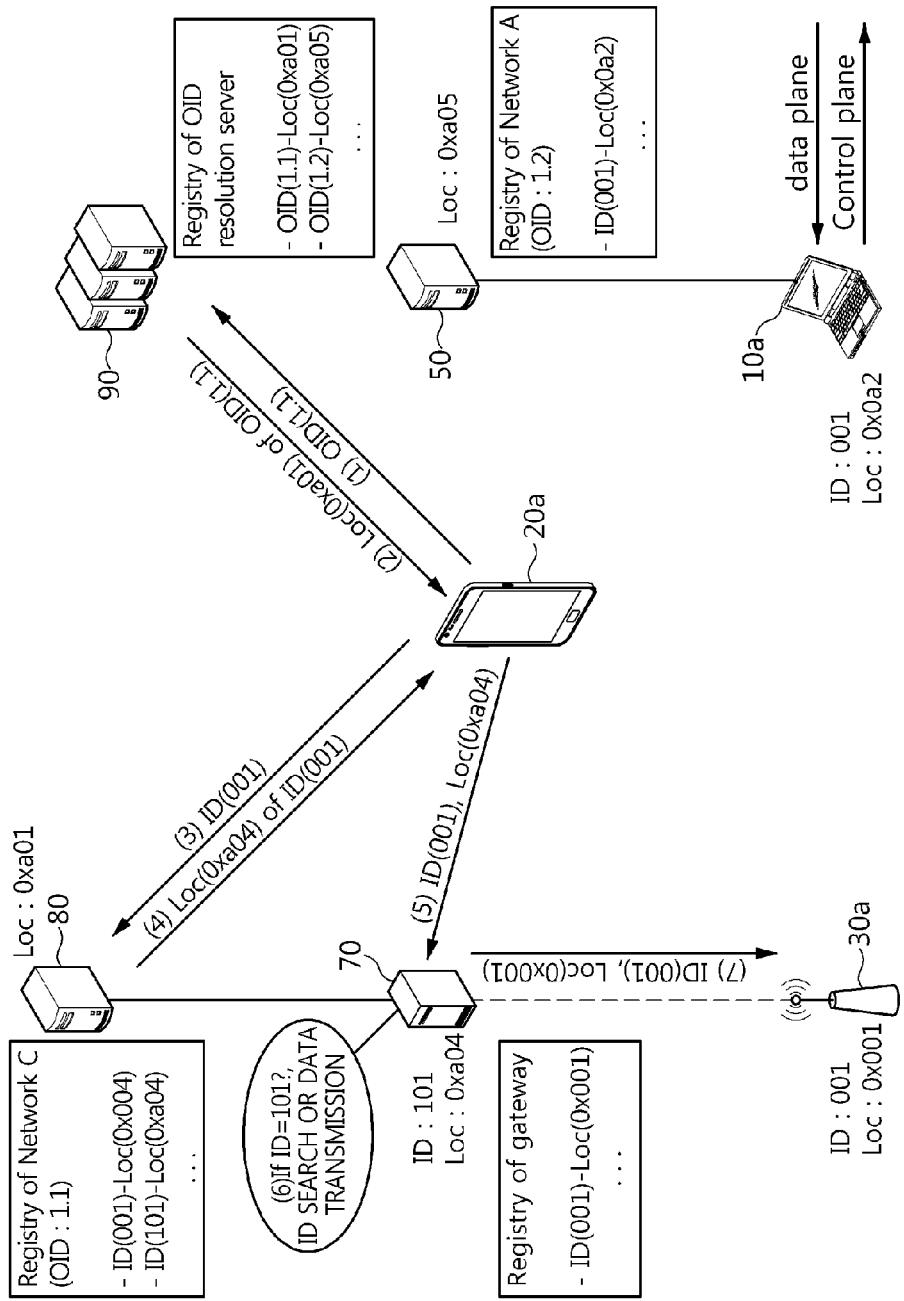
FIG. 4 is a diagram showing a process for identifying interoperability between object identifier-based heterogeneous identifier nodes for a next generation network when a destination node is indirectly connected to the network via a gateway.

Below, a process for identifying interoperability between object identifier-based heterogeneous identifier nodes for a next generation network when a destination node (another party's node) is indirectly connected to the network via a gateway will be described with reference to FIG. 4. FIG. 4 illustratively describes a case where the terminal 20a of the network B 20 desires to communicate with the sensor node 30a of the network C 30.

It is assumed that the terminal 20a of the network B 20 previously knows the identifier (ID: 001) of a destination node (that is, the sensor node 30a) which is a desired communication target node, and the object identifier (OID: 1.1) of the network C 30 (that is, the object identifier of the identifier registry server 80).

In order to communicate with the sensor node 30a, the locator of the sensor node 30 must be first searched for. For this, the terminal 20a of the network B 20 inputs the object identifier (OID: 1.1) to the OID resolution server 90.

Accordingly, the OID resolution server 90 returns the locator (0xa01) of the identifier registry server 80 corresponding to the object identifier (OID: 1.1) to the terminal 20a of the network B 20.

Then, the terminal 20a of the network B 20 is connected to the received locator (0xa01) of the identifier registry server 80 and inputs the identifier (ID: 001) of the sensor node 30a which is the desired communication target node to the corresponding identifier registry server 80.

Next, the identifier registry server 80 returns the locator (0xa04) of the gateway 70 to the terminal 20a of the network B 20.

Accordingly, the terminal 20a of the network B 20 transmits the identifier (ID: 001) and data of the sensor node 30a to the gateway 70, instead of the locator of sensor node 30a.

Then, since the gateway 70 may easily search for the locator of the corresponding sensor node 30a if the received identifier (ID: 001) of the sensor node 30a is an identifier managed thereby, the gateway 70 transfers the data to the sensor node 30a.

If the received identifier of the sensor node 30a is not an identifier managed by the gateway 70, the gateway 70 searches for the locator of the sensor node 30a by sending the identifier (ID: 001) of the sensor node 30a to the identifier registry server 80, and then transfers the data to the sensor node 30a.

Figure 5:
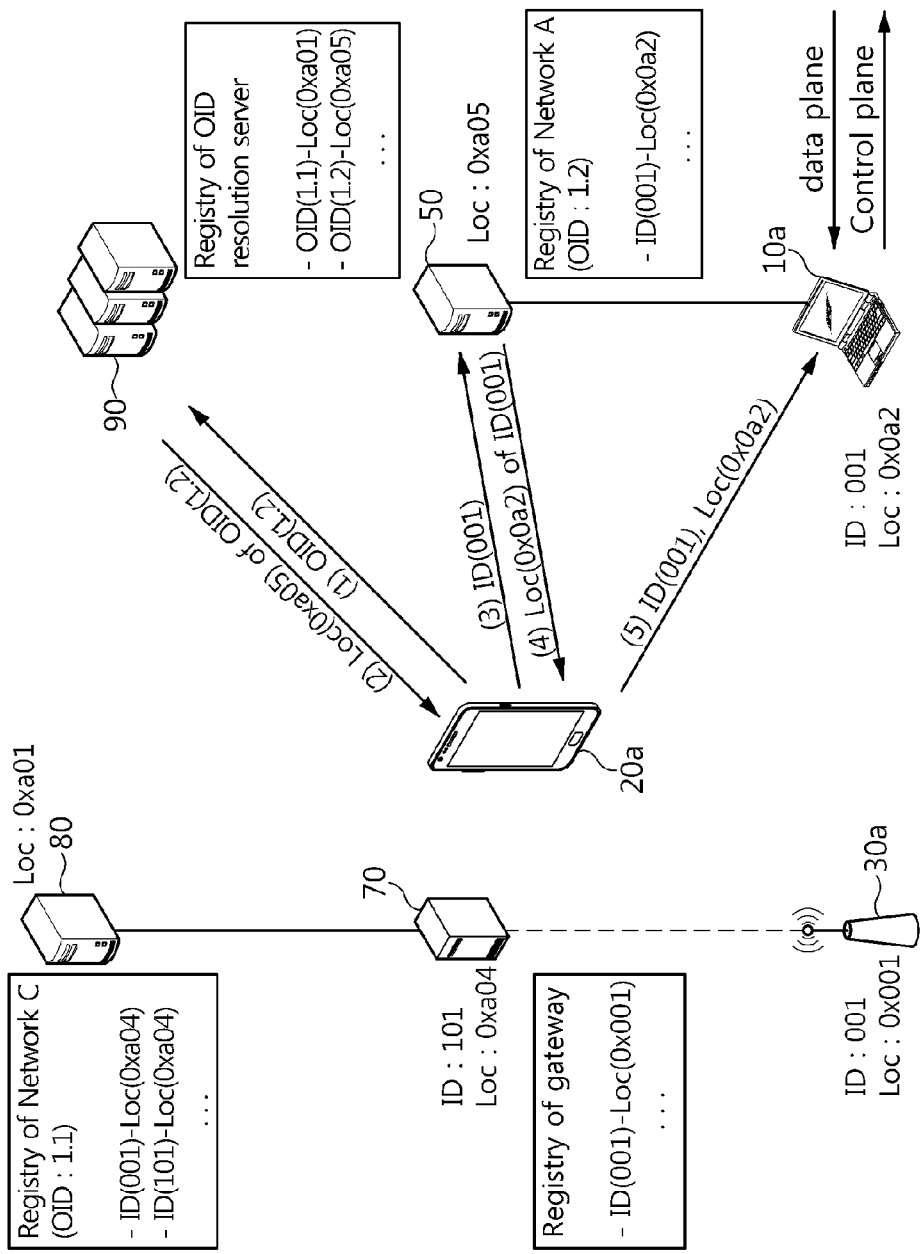
FIG. 5 is a diagram showing a process for identifying interoperability between object identifier-based heterogeneous identifier nodes for a next generation network when a destination node is directly connected to the network.

Below, a process for identifying interoperability between object identifier-based heterogeneous identifier nodes for a next generation network when a destination node is directly connected to the network will be described in detail with reference to FIG. 5. FIG. 5 illustratively describes a case where the terminal 20a of the network B 20 desires to communicate with the terminal 10a of the network A 10. Here, the terminal 10a denotes another party's node (a destination node).

It is assumed that the terminal 20a of the network B 20 previously knows the identifier (ID: 001) of the terminal 10a of the network A 10 which is a desired communication target terminal, and the object identifier (OID: 1.2) of the network A 10 (that is, the object identifier of the identifier registry server 50).

In order to communicate with the terminal 10a, the locator of the terminal 10a must be first searched for. For this, the terminal 20a of the network B 20 inputs the object identifier (OID: 1.2) to the OID resolution server 90.

Accordingly, the OID resolution server 90 returns the locator (0xa05) of the identifier registry server 50 corresponding to the received object identifier (OID: 1.2) to the terminal 20a of the network B 20.

Then, the terminal 20a of the network B 20 connects to the received locator (0-xa05) of the identifier registry server 50 and inputs the identifier (ID: 001) of the terminal 10a which is the desired communication target terminal.

The identifier registry server 50 returns the locator (0x0a2) of the terminal 10a having the identifier (ID: 001) to the terminal 20a of the network B 20.

Accordingly, the terminal 20a of the network B 20 transmits data and the identifier (ID: 001) of the terminal 10a, which the terminal 20a knows, to the locator (0x0a2) of the corresponding terminal 10a.

Finally, the terminal 10a identifies whether the received identifier (ID: 001) is identical to its own identifier, and receives the data if the received identifier is identical to its own identifier.

As described above, the embodiment of the present invention performs the process for identifying interoperability between object identifier-based heterogeneous identifier nodes for the next generation network, as shown in FIG. 4 or 5, after the registration process such as that shown in FIG. 3 has been performed. Although a separate flowchart for such a process is not presented, those skilled in the art will sufficiently derive the process from the description of FIGS. 3 to 5.

In accordance with the present invention having the above configuration, even if networks having existing heterogeneous identifiers are integrated into a single open network, the uniqueness of each identifier may be guaranteed.

Upon operating existing heterogeneous identifiers in an integrated manner, there is no need to revise existing identifier systems.

Further, even if an existing identifier functions as both an ID and a locator, or if an ID and a locator are separated, an integrated operation is possible.

Even if a new identifier system is generated and integrated into current identifier systems, the present invention may accommodate the integrated identifier system.

As described above, the present invention may manage not only an application layer ID, but also the locator of a network layer in an integrated manner. Furthermore, the present invention may associate the layers with each other to identify two heterogeneous system nodes and enable information exchange to be performed between various types of heterogeneous resources based on such identification, thus enabling next-generation high value-added services using further converged and more hybrid information to be created.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for identifying interoperability between object identifier-based heterogeneous identifier nodes for a next generation network, comprising:
a plurality of identifier registry servers respectively located in a plurality of unit networks connected to an open network, and
configured to receive and store identifiers and locators of nodes of corresponding unit networks, and
also configured to, as identifiers of destination nodes that are communication target nodes are input from the nodes of the plurality of unit networks, return the stored corresponding locators of the destination nodes,
wherein unique object identifiers are respectively assigned to the identifier registry servers; and
an object identifier resolution server located in the open network, and
configured to receive and store unique object identifiers and corresponding locators of the plurality of identifier registry servers, and
also configured to, as the unique object identifiers are input from the nodes of the plurality of unit networks, transfer the stored locators of identifier registry servers corresponding to the stored unique object identifiers of the identifier registry servers to the nodes of the plurality of unit networks,
wherein the plurality of unit networks include nodes having different heterogeneous identifiers,
wherein the plurality of unit networks include a first unit network and a second unit network, and nodes of the first unit network and the second unit network are directly connected to the open network,
wherein the plurality of unit networks further include a third unit network,
the third unit network includes a node having an identifier differing from those of nodes of the first unit network and the second unit network, and
the node of the third unit network is connected to the open network via a gateway,
wherein an identifier and a locator of the node of the third unit network are stored in the gateway,
the gateway connects the stored identifier of the node of the third unit network to its own locator, transmits a resulting identifier/locator to an identifier registry server of the third unit network, and allows the resulting identifier/locator to be stored in the identifier registry server, and
the identifier registry server of the third unit network transmits its own unique object identifier and locator to the object identifier resolution server, and allows the unique object identifier and the locator to be stored in the object identifier resolution server.

2. The apparatus of claim 1, wherein:
the object identifier resolution server is configured to, if a unique object identifier of an identifier registry server of the second unit network is input from a node of the first unit network, transmit a locator of the identifier registry server of the second unit network to the node of the first unit network, and
the identifier registry server of the second unit network is configured to, if an identifier of a destination node that is a communication target node is input from the node of the first unit network, transmit a locator of the destination node to the node of the first unit network, thus allowing data to be transmitted from the node of the first unit network to the destination node.

3. The apparatus of claim 2, wherein the node of the first unit network previously knows the identifier of the destination node that is the communication target node.

4. The apparatus of claim 1, wherein the node of the first unit network or the second unit network is configured to, if a locator of the gateway is input from the identifier registry server of the third unit network, transmit an identifier and data of a destination node of the third unit network that is a communication target node to the gateway.

5. The apparatus of claim 1, wherein:
if the node of the first unit network or the second unit network inputs a unique object identifier of an identifier registry server of the third unit network to the object identifier resolution server, the object identifier resolution server is configured to transmit a locator of the identifier registry server of the third unit network to the node of the first unit network or the second unit network, the identifier registry server of the third unit network is configured to, as an identifier of a destination node that is a communication target node is input from the node of the first unit network or the second unit network, transmit a locator of the gateway to the node of the first unit network or the second unit network, and the gateway is configured to, if the identifier and data of the destination node are input from the node of the first unit network or the second unit network, transfer the data to the destination node.

6. A method for identifying interoperability between object identifier-based heterogeneous identifier nodes for a next generation network, comprising:

transmitting, by nodes of a plurality of unit networks connected to an open network, their own identifiers and locators to identifier registry servers located in corresponding unit networks, and allowing the identifiers and locators to be registered;

transmitting, by the identifier registry servers of the plurality of unit networks, their own unique object identifiers and locators to an object identifier resolution server located in the open network, and allowing the object identifiers and the locators to be registered;

as the unique object identifiers are input from the nodes of the plurality of unit networks, transferring, by the object identifier resolution server, the locators of the identifier registry servers corresponding to the unique object identifiers to the nodes of the plurality of unit networks; and as the identifiers of destination nodes that are communication target nodes are input, returning, by the corresponding identification registry servers, the locators of the destination nodes to the nodes of the plurality of unit networks, wherein the plurality of unit networks include nodes having different heterogeneous identifiers, wherein the plurality of unit networks include a first unit network and a second unit network, and nodes of the first unit network and the second unit network are directly connected to the open network, wherein the plurality of unit networks further include a third unit network, the third unit network includes a node having an identifier differing from those of nodes of the first unit network and the second unit network, and the node of the third unit network is connected to the open network via a gateway, wherein an identifier and a locator of the node of the third unit network are stored in the gateway, the gateway connects the stored identifier of the node of the third unit network to its own locator, transmits a resulting identifier/locator to an identifier registry server of the third unit network, and allows the resulting identifier/locator to be stored in the identifier registry server, and the identifier registry server of the third unit network transmits its own unique object identifier and locator to the object identifier resolution server, and allows the unique object identifier and the locator to be stored in the object identifier resolution server.

* * * * *